US010067768B2

(12) United States Patent
Diamos et al.

(10) Patent No.: US 10,067,768 B2
(45) Date of Patent: Sep. 4, 2018

(54) EXECUTION OF DIVERGENT THREADS USING A CONVERGENCE BARRIER

(71) Applicant: NVIDIA Corporation, Santa Clara, CA (US)

(72) Inventors: Gregory Frederick Diamos, San Jose, CA (US); Richard Craig Johnson, Chapel Hill, NC (US); Vinod Grover, Mercer Island, WA (US); Olivier Giroux, Santa Clara, CA (US); Jack H. Choquette, Palo Alto, CA (US); Michael Alan Fetterman, Boxborough, MA (US); Ajay S. Tirumala, Cupertino, CA (US); Peter Nelson, San Francisco, CA (US); Ronny Meir Krashinsky, San Francisco, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 308 days.

(21) Appl. No.: 14/798,265

(22) Filed: Jul. 13, 2015

(65) Prior Publication Data

US 2016/0019066 A1  Jan. 21, 2016

Related U.S. Application Data

(60) Provisional application No. 62/026,495, filed on Jul. 18, 2014.

(51) Int. Cl.
*G06F 9/38* (2018.01)
*G06F 9/52* (2006.01)
*G06F 9/30* (2018.01)

(52) U.S. Cl.
CPC ........ *G06F 9/3867* (2013.01); *G06F 9/30145* (2013.01); *G06F 9/522* (2013.01)

(58) Field of Classification Search
CPC ..................... G06F 9/3867; G06F 9/30145
(Continued)

(56) References Cited

U.S. PATENT DOCUMENTS

| 7,353,369 B1 | 4/2008 | Coon et al. |
| 7,512,950 B1 * | 3/2009 | Marejka ............. G06F 9/52 718/102 |

(Continued)

OTHER PUBLICATIONS

Levinthal, A., "Chap—A SIMD Graphics Processor," Computer Graphics, vol. 18, No. 3, Jul. 1984, pp. 77-82.

(Continued)

*Primary Examiner* — Benjamin P Geib
*Assistant Examiner* — Shawn Doman
(74) *Attorney, Agent, or Firm* — Zilka-Kotab, PC

(57) ABSTRACT

A method, system, and computer program product for executing divergent threads using a convergence barrier are disclosed. A first instruction in a program is executed by a plurality of threads, where the first instruction, when executed by a particular thread, indicates to a scheduler unit that the thread participates in a convergence barrier. A first path through the program is executed by a first divergent portion of the participating threads and a second path through the program is executed by a second divergent portion of the participating threads. The first divergent portion of the participating threads executes a second instruction in the program and transitions to a blocked state at the convergence barrier. The scheduler unit determines that all of the participating threads are synchronized at the convergence barrier and the convergence barrier is cleared.

20 Claims, 12 Drawing Sheets

(58) Field of Classification Search
USPC .......................................................... 712/222
See application file for complete search history.

(56) References Cited

U.S. PATENT DOCUMENTS

| | | | | |
|---|---|---|---|---|
| 8,381,203 B1* | 2/2013 | Beylin | .................... | G06F 8/458 |
| | | | | 717/149 |
| 2008/0184211 A1* | 7/2008 | Nickolls | ................. | G06F 8/456 |
| | | | | 717/140 |
| 2010/0333107 A1* | 12/2010 | Omara | .................... | G06F 9/522 |
| | | | | 718/106 |
| 2012/0179896 A1* | 7/2012 | Salapura | ............. | G06F 9/30087 |
| | | | | 712/203 |
| 2014/0365752 A1* | 12/2014 | Howes | ................. | G06F 9/3851 |
| | | | | 712/233 |
| 2015/0026438 A1 | 1/2015 | Giroux et al. | | |

OTHER PUBLICATIONS

Karrenberg, R. et al., "Whole-Function Vectorization," IEEE/ACM International Symposium on Code Generation and Optimization, 2011, pp. 141-150.

Shin, J., "Introducing Control Flow into Vectorized Code," Proceedings of the 16th International Conference on Parallel Architecture and Compilation Techniques, 2007, pp. 1-12.

Barnes, G. H. et al., "The ILLIAC IV Computer," IEEE Transactions on Computers, vol. C-17, No. 8, Aug. 1968, pp. 746-757.

Strong, H. R., "Vector Execution of Flow Graphs," ACM, 1980, pp. 108-116.

\* cited by examiner

EXECUTION OF DIVERGENT THREADS USING A CONVERGENCE BARRIER

CLAIM OF PRIORITY

This application claims the benefit of U.S. Provisional Application No. 62/026,495 titled "Synchronization of Independent Threads Using Convergence Barriers," filed Jul. 18, 2014, the entire contents of which is incorporated herein by reference.

FIELD OF THE INVENTION

The present invention relates to multi-threaded program execution, and more particularly to execution of divergent threads.

BACKGROUND

The execution of threads (e.g. pthreads in Apple® and Microsoft Windows® systems, and CPU threads) in a multi-threaded processor assumes a basic guarantee of forward progress; i.e., if one thread becomes blocked, other threads continue to make progress unless the other threads depend on resources owned by the blocked thread. This guarantee is necessary to support patterns extremely common in procedural parallel programming, such as locks.

The forward progress guarantee is trivially implemented by multi-core/multiple-instruction multiple-data (MIMD) processor organizations because each thread is executed independently by the hardware. On the other hand, single-instruction multiple-data (SIMD) threads, such as threads executed by a graphics processing unit (GPU) are typically not independent at a low level. Threads at the same program counter (PC) may be scheduled concurrently on the SIMD lanes. However, if threads take different paths through the program, the threads will execute at different PCs, and cannot be scheduled concurrently. Some existing schemes serialize the execution of threads that take different paths through the program. Since some SIMD lanes will be idle when threads are executing different PCs, existing schemes schedule threads in a specific order in an attempt to reduce the idle time. However, these specific scheduling orders do not necessarily provide a forward progress guarantee because scheduling priority is given to reducing idle time. When a serialized thread becomes blocked on user-level synchronization (e.g. a lock), a number of other threads also become blocked as they wait for the blocked thread to reach a common PC. In some cases, deadlock may occur and execution of the program cannot be completed. Thus, there is a need for addressing these issues and/or other issues associated with the prior art.

SUMMARY

A method, system, and computer program product for executing divergent threads using a convergence barrier are disclosed. A first instruction at an entry point in a program is executed by a plurality of threads, where the first instruction, when executed by a particular thread, indicates to a scheduler unit that the thread participates in a convergence barrier. A first path through the program is executed by a first divergent portion of the participating threads and a second path through the program is executed by a second divergent portion of the participating threads. The first divergent portion of the participating threads executes a second instruction in the program and transitions to a blocked state at the convergence barrier. The scheduler unit determines that the participating threads are synchronized at the convergence barrier and the convergence barrier is cleared. The execution technique supports N-way divergence so that each thread of the plurality of threads may take a different path through the program and by synchronized at the convergence barrier. The execution technique ensures forward progress for each thread of the plurality of threads such that no thread can indefinitely block the execution of any other thread.

DETAILED DESCRIPTION

Convergence Barriers attempt to maintain high SIMD efficiency by keeping threads that take the same paths through a program grouped together for parallel execution of instructions. In the context of the following description, a thread refers to an agent that executes a task defined by a sequence of instructions. Concurrent tasks are often said to execute on "threads", to execute statements in sequence. Divergence is supported during execution of the program and a YIELD mechanism provides a forward progress guarantee to threads such that no thread can indefinitely block the execution of any other thread. The barriers are termed "convergence barriers" rather than simply "barriers" to indicate that the convergence barriers are used to join divergent groups of threads back together (i.e. they are used to keep threads converged on SIMD hardware). Using convergence barriers to implement a flexible thread synchronization technique is substantially different than prior art stack-based and priority-based schemes.

In one embodiment, the divergence management mechanism that relies on the convergence barriers is decoupled from the thread scheduling mechanism. Therefore, the thread scheduling mechanism may be changed without changing the divergence management mechanism. Similarly, the divergence management mechanism may be changed without changing the thread scheduling mechanism.

In one embodiment, a compiler is configured to analyze an application program, identify regions of the program having a single entry point and a single exit point and insert convergence barrier instructions to synchronize threads that may diverge within each region. In the context of the following description, the single entry point may correspond to a dominator node of a directed control-flow graph of the program and the single exit point may correspond to a post-dominator node of the directed control-flow graph of the program.

Figure 1:
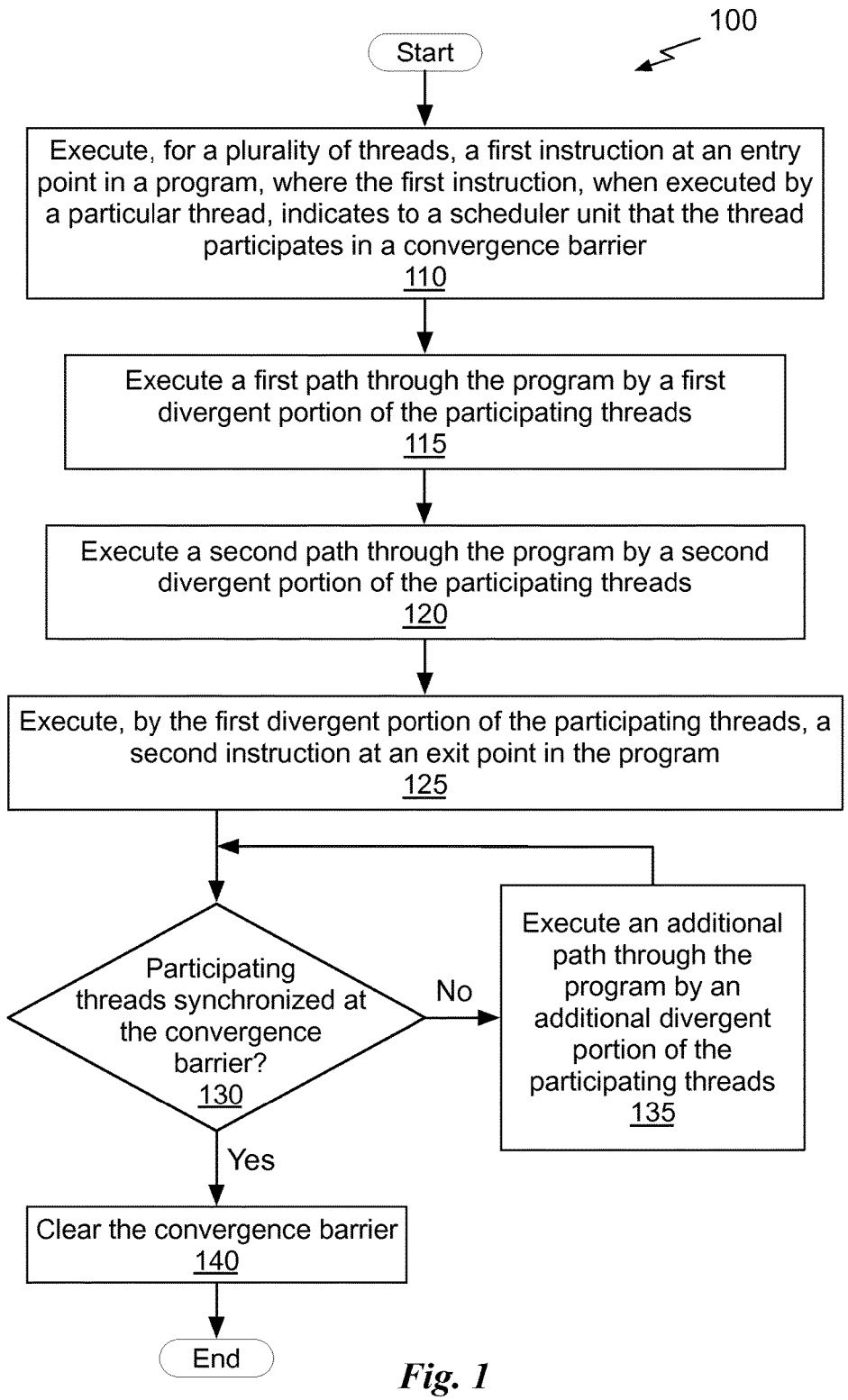
FIG. 1 illustrates a flowchart of a method for executing divergent threads using a convergence barrier, in accordance with one embodiment.

FIG. 1 illustrates a flowchart of a method 100 for executing divergent threads using a convergence barrier, in accordance with one embodiment. At step 110, a plurality of threads execute a first instruction at an entry point in a program, where the first instruction, when executed by a particular thread, indicates to a scheduler unit that the thread participates in a convergence barrier. In other words, execution of the first instruction by a thread "adds" the thread to the convergence barrier. In one embodiment, an ADD instruction may be inserted into the program by a compiler. The ADD instruction may specify a convergence barrier name and each thread that executes the ADD instruction participates in the named convergence barrier. In one embodiment, a multi-bit register may correspond to each convergence barrier name and a bit is assigned for each thread that may participate in the convergence barrier. When a thread executes the instruction that specifies a convergence barrier, the bit assigned to the thread is set in the multi-bit register. The convergence barrier is represented by a WAIT instruction that may also be inserted into the program by the compiler. The WAIT instruction also specifies the name used by the ADD instruction. The WAIT instruction is usually a convergence point for various divergent code-paths that synchronize on a specific barrier.

At step 115, a first path through the program is executed by a first divergent portion of the participating threads (e.g., threads that participate in the convergence barrier). The first path through the program may be different than one or more other paths taken by other threads of the participating threads. Each different path through the region of the program is a divergent path.

At step 120, a second path through the program is executed by a second divergent portion of the participating threads that are ready for execution. The second divergent portion of the participating threads is different than the first divergent portion of the participating threads. In one embodiment, the first divergent portion of the participating threads are executed by a first core within a parallel processing unit and the second divergent portion of the participating threads are simultaneously executed by a second core within the parallel processing unit. Additional paths through the program may be executed other divergent portions of the participating threads. In the extreme, each participating thread may execute a different path through the program so that for N threads, the execution is N-way divergent.

At step 125, the first divergent portion of the participating threads executes a second instruction at an exit point in the program, where the second instruction, when executed by a particular thread, causes the particular thread to transition to a blocked state. In one embodiment, a state of the first divergent potion of the participating threads changes from ready (i.e., ready for execution) to blocked when the second instruction is executed. In one embodiment, the second instruction is a WAIT instruction that specifies the convergence barrier matching the name specified by the ADD instruction.

If the second divergent portion of the participating threads executes the WAIT instruction that specifies the convergence barrier matching the name specified by the ADD instruction, execution is stopped and the state of the threads in the second divergent potion of the participating threads changes from ready to blocked. In one embodiment, the second divergent portion does not necessarily execute the second instruction and instead executes a third instruction. The third instruction may be either an OPT-OUT instruction or a YIELD instruction. In one embodiment, the OPT-OUT instruction is functionally equivalent to a Break instruction.

At step 130, a scheduler unit determines if the participating threads are synchronized at the convergence barrier. In the context of the following description, the scheduler unit may be implemented as circuitry and included within a multi-threaded execution unit, such as a streaming multi-processor. In one embodiment, the scheduler unit determines that the participating threads are synchronized when all of the participating threads have reached the second instruction (e.g., WAIT instruction) that specifies the convergence barrier matching the name specified by the first instruction (e.g., ADD instruction) and determines that all of the participating threads are blocked.

In one embodiment, one more threads of the participating threads may have exited the program and are no longer considered to be included in the participating threads (i.e., exited threads are removed from the participating threads). In other words, in one embodiment, a region of the program may have a single entry and multiple exits. In one embodiment, threads may exit the region of the program when an OPT-OUT instruction is executed. The OPT-OUT instruction may be inserted into the program by the compiler. In one embodiment, a state of threads that execute an OPT-OUT instruction is changed from ready to exited. In another embodiment, the state of threads that execute an OPT-OUT instruction is unchanged and is maintained as ready.

In one embodiment, one or more threads of the participating threads may be disabled when the one or more threads execute a YIELD instruction. In one embodiment, one or more threads of the participating threads may be disabled when a YIELD condition is met even though a YIELD instruction has not been executed. The scheduler unit may determine a YIELD condition is met when a timeout event occurs or based on characteristics of execution, such as a certain number of backward branches being executed. The YIELD instruction may be inserted into the program, by the compiler, for threads that may not arrive at the convergence barrier. In one embodiment, participating threads that are disabled may be ignored for the synchronization determination. In other words, participating threads that are disabled may be treated as blocked at step 130. In one embodiment, a state of threads that execute a YIELD instruction is changed from ready to yielded.

If, at step 130, the scheduler unit determines that the participating threads are synchronized at the convergence barrier, then at step 140, the convergence barrier is cleared and all threads that participated in the convergence barrier are released, i.e., unblocked. In one embodiment, participating threads that are in the yielded state are changed to the ready state. In other words, yielded threads are cleared (i.e., bits corresponding to yielded threads are cleared in the multi-bit register) when the convergence barrier is cleared. When the convergence barrier clears, all threads that were blocked on the convergence barrier will be grouped together and resume execution in SIMD fashion.

If, at step 130, the scheduler unit determines that the participating threads are not synchronized at the convergence barrier, then at step 135 the scheduler unit may execute an additional path (e.g., third, fourth . . . path) through the program by an additional divergent portion of the participating threads (e.g., third, fourth . . . Nth divergent portion of the participating threads), and return to step 130. The additional path may be different than either the first path or the second path. The additional divergent portion of the participating threads may be different than the first and second divergent portions of the participating threads.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
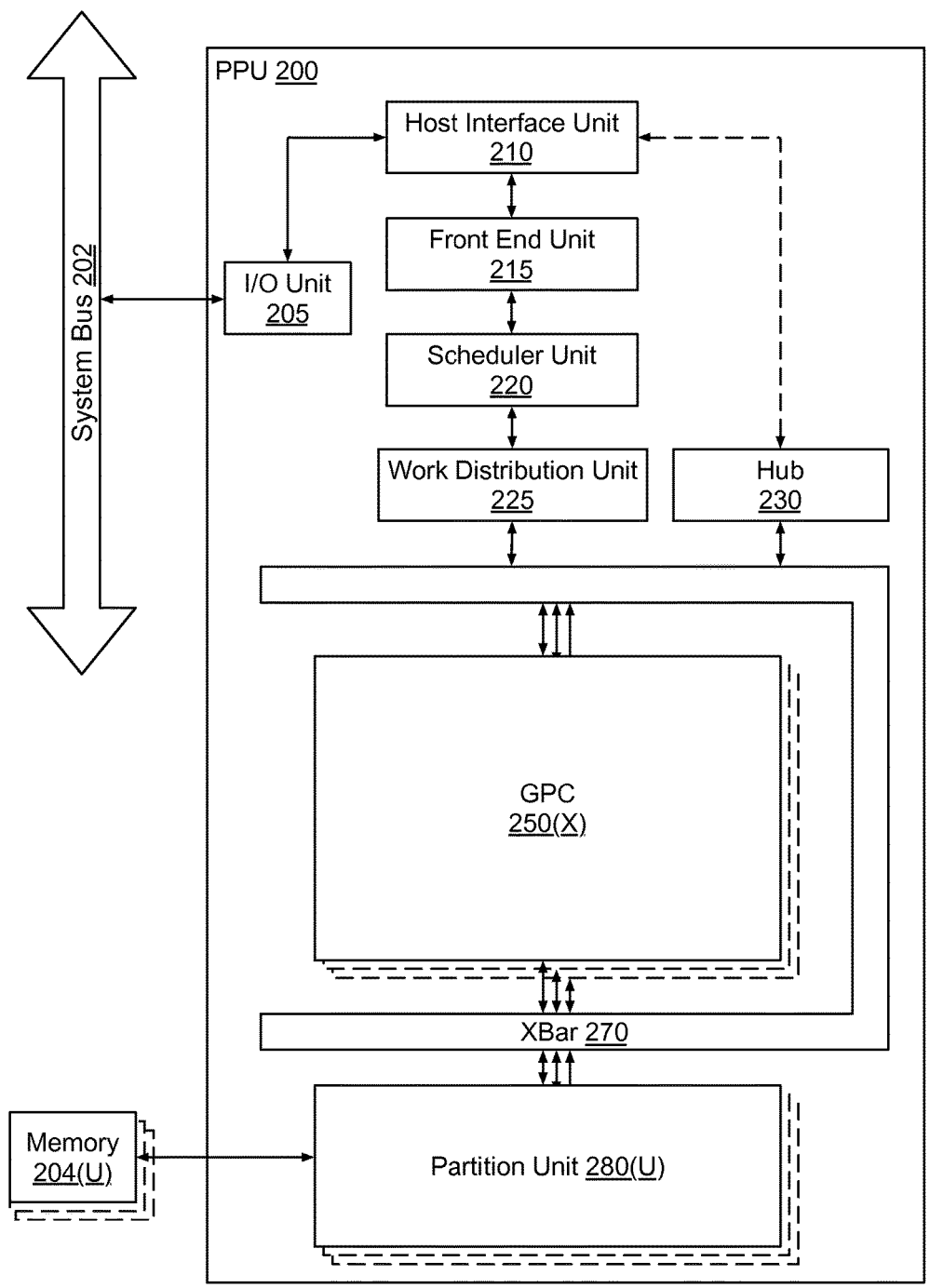
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via a XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3:
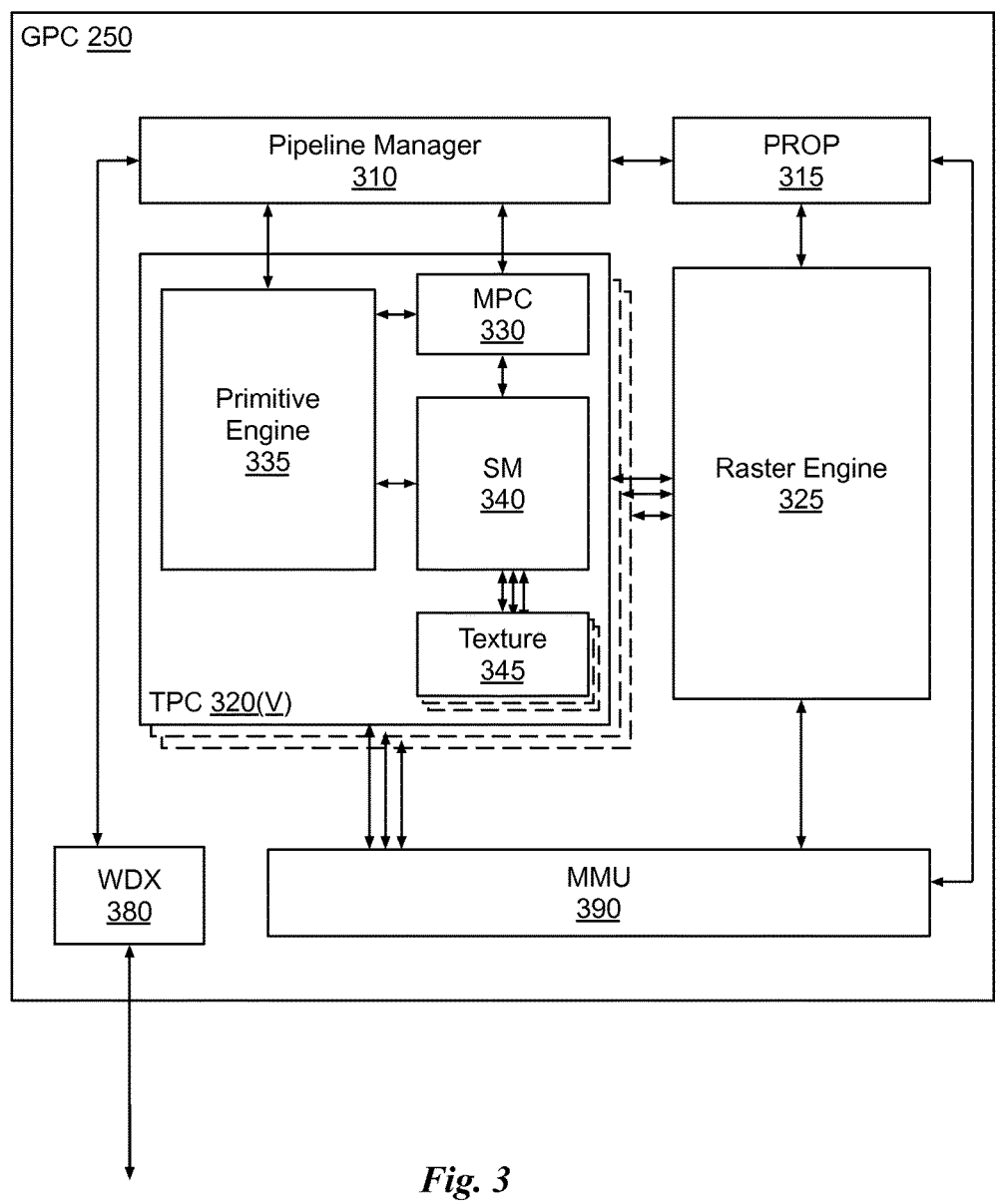
FIG. 3 illustrates a general processing cluster of the parallel processing unit of FIG. 2, in accordance with one embodiment.

FIG. 3 illustrates a GPC 250 of the PPU 200 of FIG. 2, in accordance with one embodiment. As shown in FIG. 3, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3 may include other hardware units in lieu of or in addition to the units shown in FIG. 3.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes four (4) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 4A:
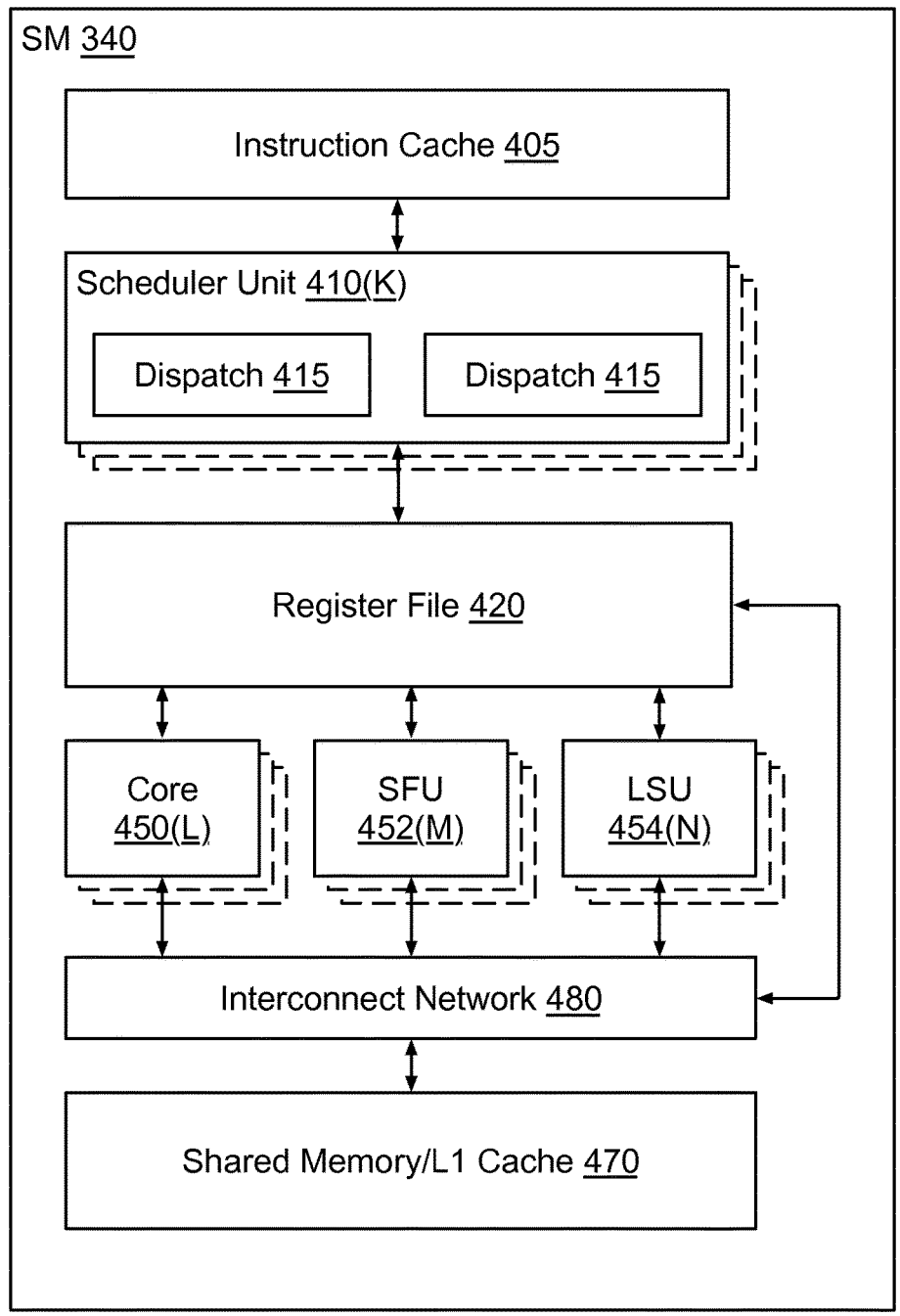
FIG. 4A illustrates the streaming multi-processor of FIG. 3 in accordance with one embodiment.

FIG. 4A illustrates the streaming multi-processor 340 of FIG. 3, in accordance with one embodiment. As shown in FIG. 4A, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4A, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., pixel blending operations, and the like), and N LSUs 454 that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

CONVERGENCE BARRIER OPERATION

Thread divergence is managed using one or more convergence barriers to synchronize threads that have taken different paths during execution of the program and have not exited the program. Once threads have synchronized at a convergence barrier, the threads may begin executing instructions in lock-step SIMD manner again.

A convergence barrier, as the term is used herein, refers to a programming abstraction for managing thread divergence in a SIMD architecture. In one embodiment, the convergence barrier includes operations, associated with instructions executed by the scheduling unit 410, and a set of hardware for performing the operations. The set of hardware may include a multi-bit register corresponding to each of one or more convergence barrier names implemented by the SIMD architecture and made available to programmers through the instructions.

In one embodiment, convergence barriers support two main operations: ADD and WAIT. ADD adds a set of active threads to participate in a specific convergence barrier that is named by the ADD instruction. WAIT suspends the execution of threads until all participating threads have arrived. The compiler is responsible for placing ADD instructions at the entry points to a control flow region (e.g., portion of a program) that may contain a divergent branch, and for placing WAIT instructions at the exit points to the region. Ideally, regions will have a single exit point, and threads that take divergent paths within the region will synchronize at the exit point.

Conceptually, each control flow region in the program is assigned a unique convergence barrier (or other type of barrier) by the compiler. In one embodiment, N different names are available and state information may be stored for each one of the N different convergence barriers. However, in some embodiments, a mechanism may be required to map logical barriers (the number of which is unbounded) to hardware resources such as registers (which are finite). There are multiple techniques for handling the mapping (e.g. with a memory-backed cache, with compiler-managed allocation, with software-managed scheduling, etc).

Typically, a group of threads will enter a region synchronized and configure a convergence barrier based on an ADD instruction included at the entry point to the region. In one embodiment, threads may execute an ADD instruction that is not at the entry point to the region and participate in the convergence barrier. The ADD instruction indicates that a thread executing the ADD instruction participates in a convergence barrier named by the ADD instruction. Then, when executing instructions within the region, the threads may take different execution paths through the region. Eventually, each of the threads will reach a WAIT instruction at the end of the region. At the WAIT instruction, the threads are suspended until the convergence barrier releases, and the scheduler unit 410 selects another set of threads to execute.

The convergence barrier releases when all threads that participated in the convergence barrier arrive at the WAIT instruction and have a status of blocked. However, one or more threads participating in the convergence barrier may exit the region and terminate participation in the convergence barrier by executing an OPT-OUT instruction included in a divergent path of the region. In one embodiment, threads that execute an EXIT instruction change from a ready state to an exited state, but do not explicitly terminate participation in the convergence barrier. Instead, the scheduler unit 410 ignores threads that participate in a barrier and have a state of exited, but have not arrived at the convergence barrier.

One or more other threads participating in the convergence barrier may execute a YIELD instruction included in another divergent path of the region, and threads that have arrived at the convergence barrier need not wait for the yielding threads to release the convergence barrier. Likewise, the yielding threads need not necessarily execute the WAIT instruction. Regardless, once the convergence barrier is cleared, the yielding threads no longer participate in the convergence barrier.

Disjoint subsets of threads may participate in a convergence barrier if both subsets of threads execute an ADD instruction specifying the convergence barrier before either subset of threads executes the WAIT instruction. In this case, both subsets of threads will add themselves to the convergence barrier before either one of the subsets of threads reaches the convergence barrier. The subset of threads that reaches the WAIT instruction first will block on the convergence barrier unit the other subset of threads arrives. This type of re-convergence behavior is not possible when a stack-based divergence mechanism is used.

Figure 4B:
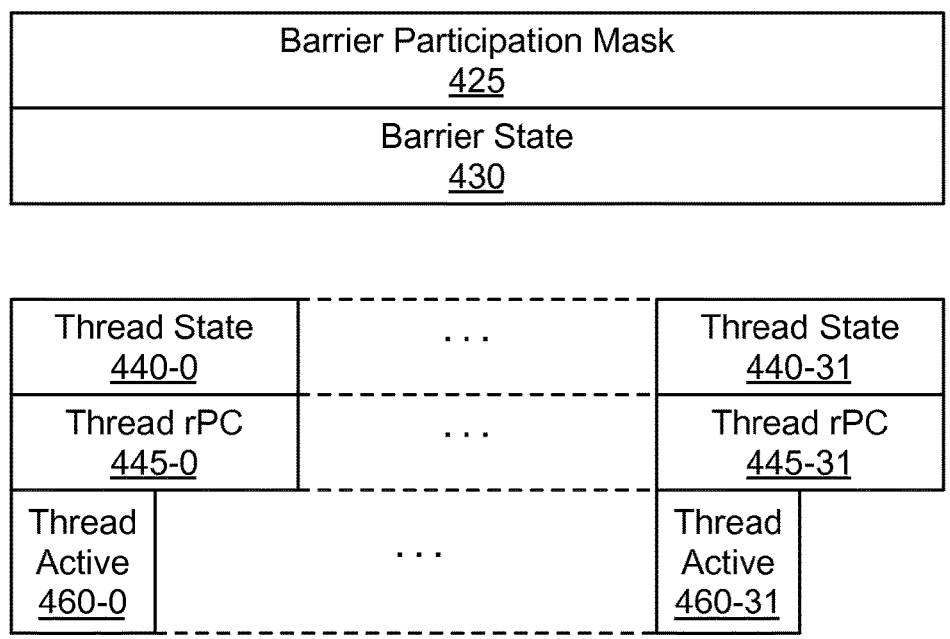
FIG. 4B illustrates convergence barrier state, in accordance with one embodiment.

FIG. 4B illustrates convergence barrier state, in accordance with one embodiment. The scheduler unit 410 functions to achieve two objectives: ensuring forward progress and executing divergent paths such that they converge as soon as possible. To support these objectives, state information is maintained for each convergence barrier and each thread in a warp. The state information may be stored in registers. A barrier participation mask 425 indicates the threads in a warp that participate in a convergence barrier. In one embodiment, a single bit is stored for each thread in the warp. Bits corresponding to threads that participate in the convergence barrier are set in the barrier participation mask 425 when an ADD instruction is executed. The bits corresponding to the threads that participate in the convergence barrier are cleared when the convergence barrier is cleared (or when a corresponding thread executes an OPT-OUT instruction). When the convergence barrier is cleared the thread state for threads participating in the barrier is changed from either blocked or yielding to ready.

Barrier state 430 may also include an identifier of the last thread that was selected for execution by the scheduler unit 410 so that round-robin scheduling may be implemented by the scheduler unit 410. Barrier state 430 may also include a yield counter that counts the number of YIELD instructions that have been executed by the active threads. In one embodiment, when the yield counter crosses a threshold, the Yield action is performed to release the convergence barrier and the yield counter is reset.

Thread state 440 is maintained for each thread in a warp. As shown in FIG. 4B, there are 32 threads in a warp, although in other embodiment, a different number of threads may be included in a warp. The thread state 440 indicates the current state of a thread. In one embodiment, threads in a warp are in at exactly one of the following states:

Ready state: thread ready for execution.

Blocked state (1-N): Thread is not eligible for execution because it is blocked on a convergence barrier. The state specifies the barrier number that a thread is blocked on.

Yielded state: Thread has voluntarily yielded its execution by executing the YIELD instruction. The scheduler unit 410 can move the yielded thread to ready state and the thread can be scheduled again. Also, convergence barriers should not wait for a yielded thread to be released.

Exited state: thread has executed an EXIT instruction.

Ready- state: thread has executed a NANOSLEEP instruction and remains in this state until the thread is scheduled again, or until the sleep timer expires.

Blocked+state: thread is blocked on a barrier and the scheduler unit 410 requires all threads participating in the barrier to be synchronized, including yielded threads. In one embodiment, this state is entered when a WAIT instruction is executed for threads participating in a specific number of convergence barrier (e.g., convergence barrier 15).

Thread active 460 indicates whether the thread is active, i.e., selected by the scheduler unit 410 for execution. Only threads in the Ready state may be active. Thread rPC 445 stores a program counter that is written by the scheduler unit 410 when the thread leaves the active mask. When the thread is not active the rPC stores the program counter of an instruction that the thread will execute when unblocked. The rPC is read when a new active mask is constructed by the scheduler unit 410.

As previously explained, forward progress is guaranteed for the threads executing on the SM 340. Individual threads will eventually execute instructions when all other threads either synchronize or exit the program. Forward progress between warps is handled implicitly by the scheduler unit 410, which runs warps independently. Providing a forward progress guarantee to threads within a warp is more difficult because warps run in SIMD fashion, i.e. they can only execute threads at the same PC simultaneously. If threads are at different PCs, then it is necessary to periodically switch between threads to provide forward progress. However, threads that are not running synchronously at the same PC incur a performance overhead, so the SM 340 has a strong motivation to attempt to synchronize divergent threads as soon as possible.

The scheduler unit 410 is responsible for picking a new set of threads at the same PC that are not waiting on a convergence barrier, and loading them onto the SIMD datapath. Once the new set of threads is selected by the scheduler unit 410, the selected threads are run until they diverge or transfer control back to the scheduler unit 410. When the threads execute a divergent branch, the threads will no longer all be at the same PC and cannot continue to execute concurrently. At this time, some threads that took the same path will continue executing, and all other threads will be suspended by the scheduler unit 410.

The scheduler unit 410 will remember the PC of the suspended threads so that execution of the suspended threads may be resumed later. In one embodiment, the scheduler unit 410 may also periodically switch the currently active threads with any other threads that are not waiting on a convergence barrier. The divergent path logic of the scheduler unit 410 attempts to simultaneously maximize opportunities for divergent threads to synchronize and not violate the forward progress guarantee.

In one embodiment, the scheduler unit 410 implements a scheduling policy where structured control flow blocks are scheduled in depth-first order. Once all structured paths have been scheduled, unstructured paths (corresponding to OPT-OUT and YIELD) are scheduled in a round-robin manner. The depth-first order is determined by saving, in a stack, an identifier of a thread that is disabled on a divergent branch. When the scheduler unit 410 switches to another thread, the scheduler unit 410 pops the entry from the top of the stack and schedules the popped thread corresponding to the identifier (along with all other threads at the same PC). If the stack is empty, the scheduler unit 410 picks a new thread in round-robin order.

Figure 5A:
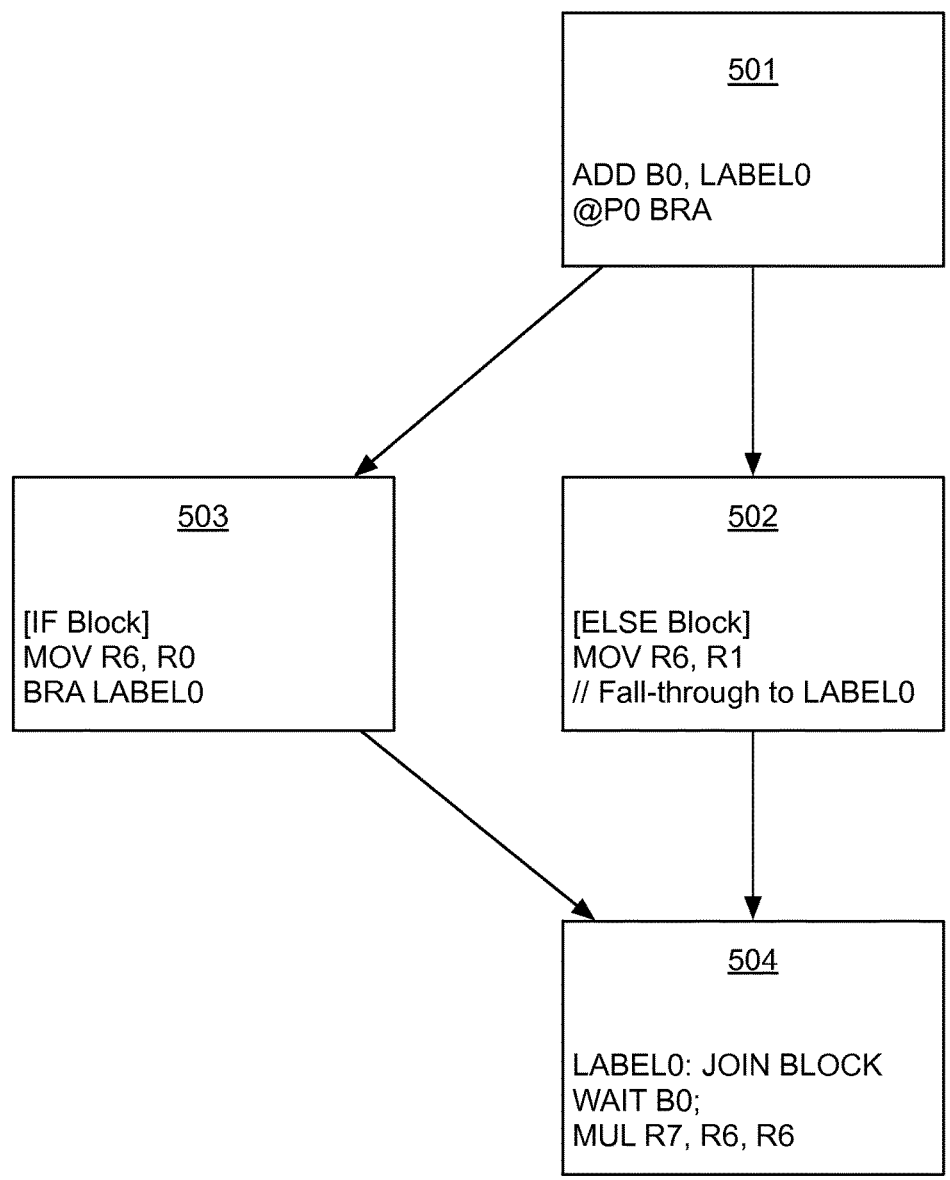
FIG. 5A illustrates an example of a convergence barrier for a region of a program with conditional flow, in accordance with one embodiment.

FIG. 5A illustrates a control flow graph that represents a program with conditional flow, in accordance with one embodiment. Each node 501, 502, 503, and 504 in the control flow graph represents a block of one or more instructions that are executed in sequence without any branches. An edge connecting two nodes represents a branch. Structured control flow is defined as any induced subgraph of a program control flow graph with a single entry point and a single exit point.

In the node 501, threads are added to the convergence barrier B0 at the entry point to the region of the program. The barrier participation mask 425 is updated to indicate that the threads participate in the convergence barrier B0. The threads may diverge when the branch instruction (BRA) is executed. For example, while executing @P0 BRA, the threads that have the predicate P0 will take the branch, while the threads that do not have the predicate P0 set will take the fall-through path. A first divergent path is the node 503 and a second divergent path is the node 502. In one embodiment, the scheduler unit 410 selects one of the two divergent paths to execute ending in the WAIT instruction in the node 504, at which point the active threads will block on the convergence barrier B0 and the remaining threads will execute the other divergent path. In one embodiment, the scheduler unit 410 selects the divergent path with the fewest number of active threads (according to thread active 460) to execute first. When the number of active threads is equal, the scheduler unit 410 may select the fall-through path (e.g., node 502). After the selected divergent path is executed, the other divergent path will execute through the WAIT instruction, and the convergence barrier will be released. Finally, all of the original threads will resume execution after the WAIT instruction.

Figure 5B:
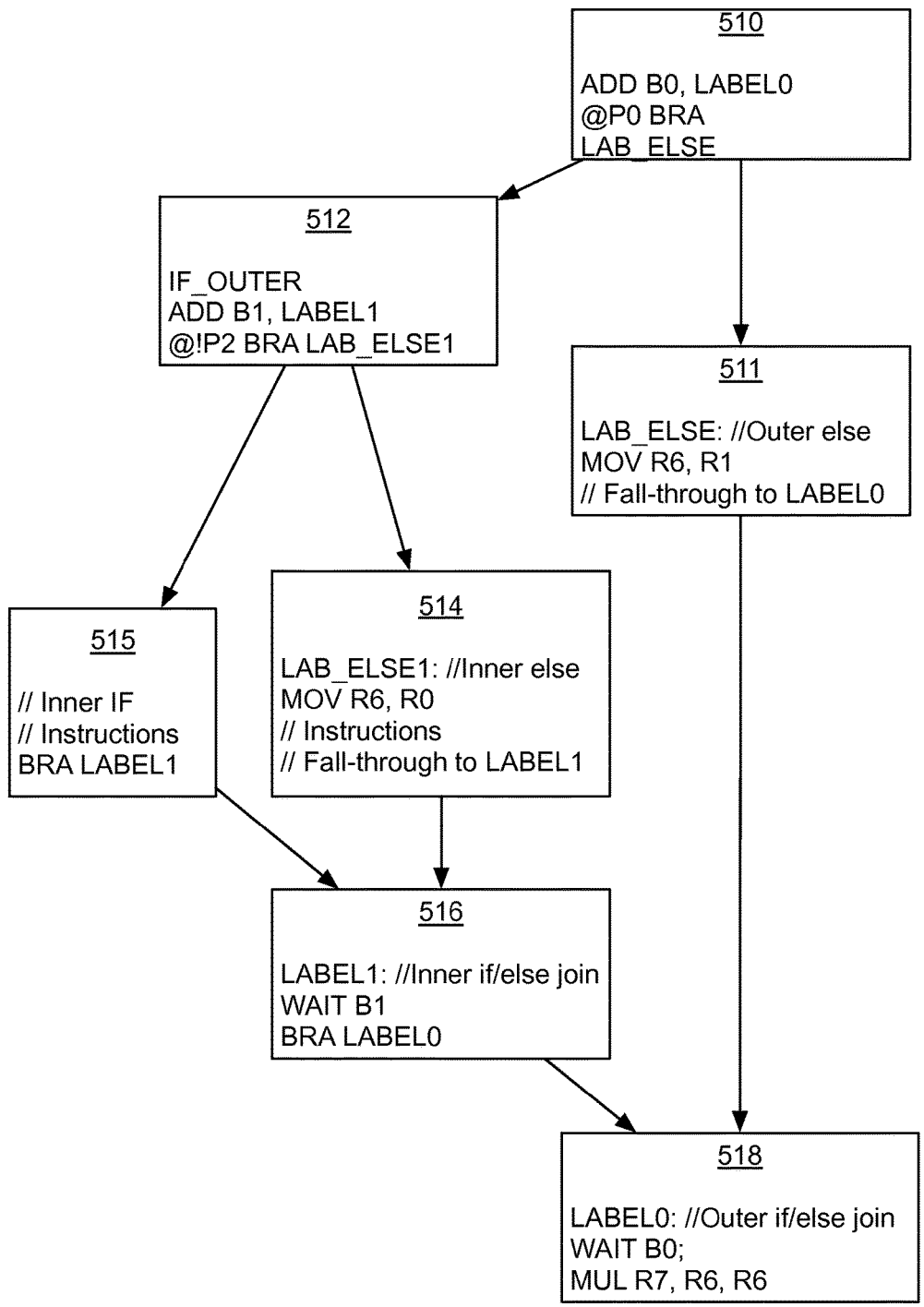
FIG. 5B illustrates an example of a convergence barrier for a region of a program with nested control flow, in accordance with one embodiment.

Control flow regions may be nested arbitrarily, and a set of threads that have synchronized at an inner nesting level can subsequently synchronize with another set of threads in an outer nesting level. FIG. 5B illustrates a control flow graph that represents a program with nested control flow, in accordance with another embodiment. Each node 510, 511, 512, 514, 515, 516, and 518 in the control flow graph represents a block of one or more instructions that are executed in sequence without any branches.

In the node 510, threads are added to the convergence barrier B0 at the entry point to the region of the program. The barrier participation mask 425 for the convergence barrier B0 is updated to indicate that the threads participate in the convergence barrier B0. The convergence barrier B0 synchronizes threads at an outer if/else block at the exit point of the region of the program. The threads participating in the convergence barrier B0 may diverge when the branch instruction (BRA) is executed. A first divergent path is the node 512 and a second divergent path is the node 511. A first set of divergent threads that take the first divergent path may include zero threads or up to all threads that participate in the convergence barrier B0. A second set of divergent threads that take the second divergent path includes the remaining threads that participate in the convergence barrier B0.

In the node 512 of the second divergent path, the second set of divergent threads are added to a convergence barrier B1 corresponding to an inner if/else block within the region of the program. The barrier participation mask 425 for the convergence barrier B1 is updated to indicate that the threads participate in the convergence barrier B1. The second set of divergent threads that participate in the convergence barriers B0 and B1 may diverge when the branch instruction (BRA) in the node 512 is executed. A third divergent path is the node 515 and a fourth divergent path is the node 514. The convergence barrier B1 synchronizes the threads in the second set of divergent threads at the WAIT instruction in the node 516 of the region of the program.

The scheduler unit 410 selects either the first or second divergent path to execute ending at either the WAIT instruction in the node 518 or the WAIT instruction in the node 516, respectively. When the second set of divergent threads executing the third and fourth divergent paths have both executed to reach the convergence barrier B1, the convergence barrier B1 is released and the threads in the second set of divergent threads resume SIMD execution until they reach the convergence barrier B0 in node 518. The barrier participation mask 425 for the convergence barrier B1 is updated to indicate that the convergence barrier B1 is cleared. When all of the threads participating in the convergence barrier B0 have executed the WAIT instruction in the node 518, the convergence barrier B0 is released. The barrier participation mask 425 for the convergence barrier B0 is updated to indicate that the convergence barrier B0 is cleared. Finally, all of the threads in the first and second sets of divergent threads resume execution after the WAIT instruction in the node 518.

Figure 5C:
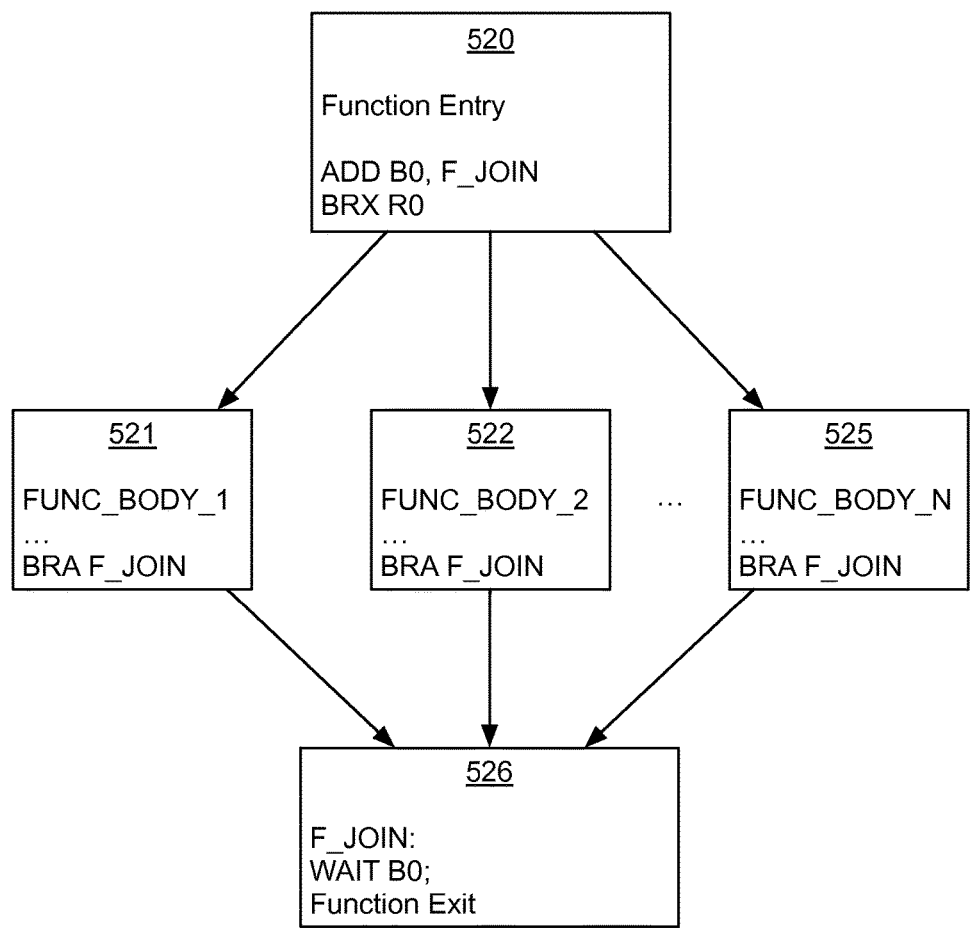
FIG. 5C illustrates an example of a convergence barrier for a region of a program with function calls, in accordance with one embodiment.

FIG. 5C illustrates an example of a control flow graph of a region of a program with function calls, in accordance with one embodiment. Each node 520, 521, 522, 525, and 526 in the control flow graph represents a block of one or more instructions that are executed in sequence without any branches. An edge connecting two nodes represents a branch. Function calls can be synchronized with ADD instruction at the entry point in the node 520 and a WAIT instruction at the return point in the node 526.

Inline function calls are equivalent to branches. Function-calls that use function-pointers are implemented using a branch instruction (BRX). For example, BRX R0 causes each thread to branch to a location that is determined by the per-thread register value R0. In the node 520, threads are added to the convergence barrier B0 at the entry point to the region of the program. The barrier participation mask 425 for the convergence barrier B0 is updated to indicate the threads that participate in the convergence barrier B0. The convergence barrier B0 synchronizes threads after the function-calls complete. The threads participating in the convergence barrier B0 may diverge when the branch instruction is executed. A first divergent path is the node 521, a second divergent path is the node 522, and an $N^{th}$ divergent path is the node 525. Each set of divergent threads that takes one of the divergent paths may include zero threads or up to all threads that participate in the convergence barrier B0. The threads participating in the convergence barrier each execute one of the divergent paths and wait for all of the participating threads to reach the convergence barrier at the node 526. When all of the participating threads execute the WAIT instruction at the node 526, the barrier participation mask 425 for the convergence barrier B0 is updated to indicate that the convergence barrier B0 is cleared.

Figure 5D:
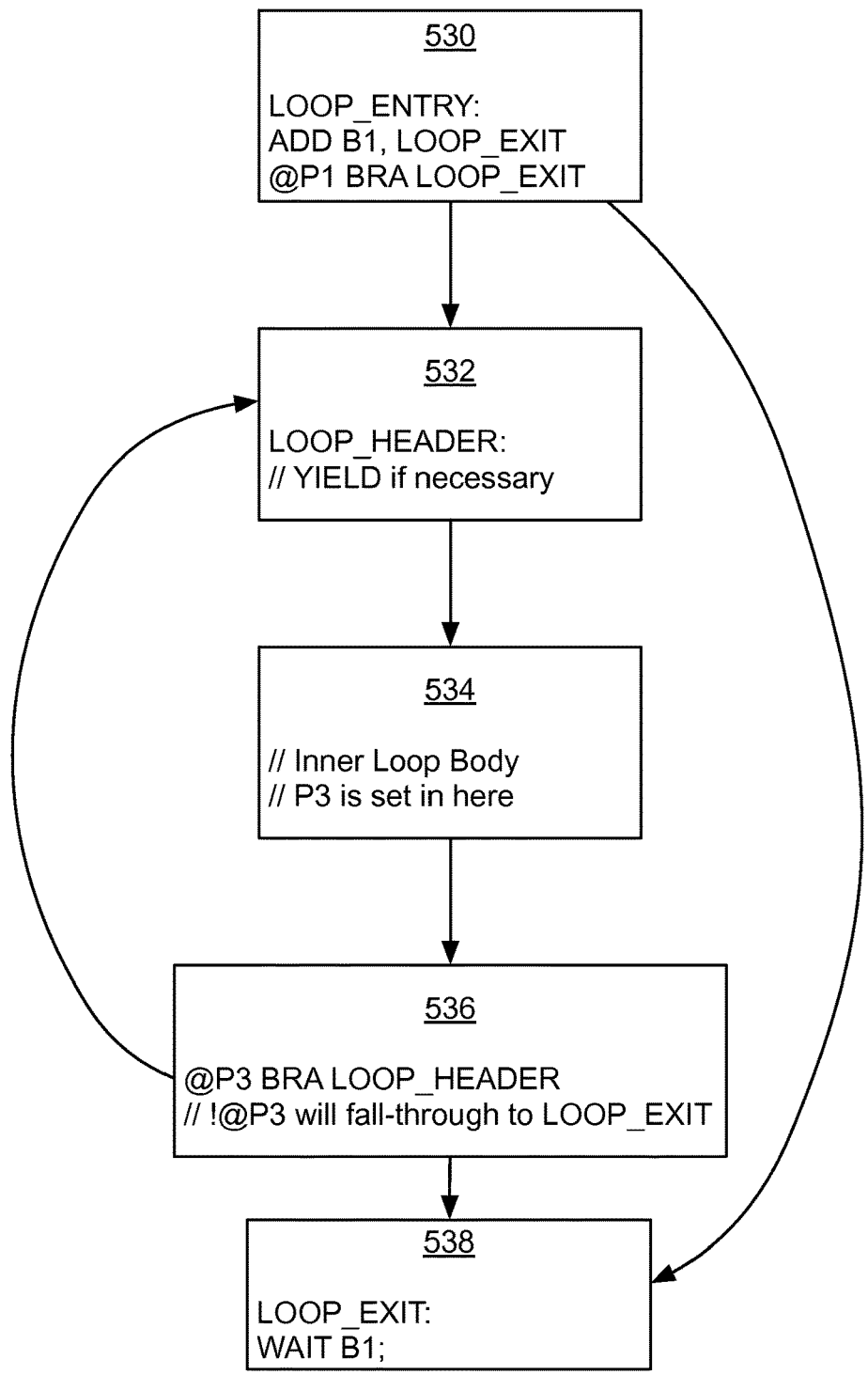
FIG. 5D illustrates an example of a convergence barrier for a region of a program with divergent loop control flow, in accordance with one embodiment.

FIG. 5D illustrates a control flow graph of a region of a program with divergent loop control flow, in accordance with one embodiment. Note that as described thus far, convergence barriers provide a way for scheduling threads that reduce SIMD idle time, but they do not necessarily provide a forward progress guarantee. This is because the WAIT operation will block some threads until other threads arrive at the WAIT instruction. If the other threads do not arrive for some reason (e.g. they are waiting for yet another set of threads in a way that forms a circular dependency), then the waiting threads block indefinitely. To address the indefinite blocking issue, in one embodiment, the YIELD instruction is inserted into the region of the program with divergent loop control flow. Threads that execute the YIELD instruction change their state from ready to yielded. The 'yielded' state indicates that any convergence barrier waiting for the threads to arrive may be released when all non-yielding threads participating in the convergence barrier have reached the convergence barrier. Threads that execute the YIELD instruction will also be suspended by clearing the thread active 460 for each yielding thread. While releasing the convergence barrier does allow for forward progress, releasing the convergence barrier when all of the threads are not at the convergence barrier skips an opportunity for divergent threads to synchronize, reducing SIMD efficiency.

As shown in FIG. 5D, each node 530, 532, 534, 536, and 538 in the control flow graph represents a block of one or more instructions that are executed in sequence without any branches. An edge connecting two nodes represents a branch or a fallthrough path. In the node 530, threads are added to the convergence barrier B1 at the entry point to the region of the program. The threads may diverge when the branch instruction (BRA) is executed. A first divergent path branches around the loop to the node 538 and a second divergent path is through the nodes 532, 534, and 536. A first set of divergent threads that take the first divergent path may include zero threads or up to all threads that participate in the convergence barrier B1. A second set of divergent threads that take the second divergent path includes the remaining threads that participate in the convergence barrier B1.

Threads in the first set of divergent threads block on the WAIT instruction in the node 538 and wait for the threads in the second set of divergent threads to execute through the loop when a YIELD instruction is not included in the node 532. As each thread in the second set of divergent threads exits the loop, the exiting threads block on the WAIT instruction in the node 538. When all of the threads in the second set of divergent threads have exited the loop, the threads in the first set of divergent threads and the threads in the second set of divergent threads are synchronized and resume execution being converged.

The node 532 may include a YIELD instruction that allows threads to not synchronize at the convergence barrier, so that the synchronization is flexible. When a thread executes the YIELD instruction, execution of the thread is suspended and the thread is placed in the yielded state. Threads are suspended to give other threads a chance to execute and the yielding threads will not participate in the next convergence barrier. The convergence barrier B1 is released when all of the threads taking the first divergence path are blocked at the convergence barrier and when all of the threads taking the second divergence path are either blocked at the convergence barrier or are in the yielded state.

When there is a choice between multiple divergent paths to execute, the scheduler unit 410 is responsible for making sure that all paths eventually get to execute. In one embodiment, a round-robin technique is used to select ready threads for execution. The compiler is responsible for ensuring that a divergent path does not execute indefinitely by periodically yielding to the thread scheduler by inserting the YIELD instruction as needed (thereby implementing a form of cooperative multi-threading). The compiler may be assisted in ensuring that a divergent path does not execute indefinitely by suitable language specifications that place restrictions on infinite loops, e.g. as in C++, where specific side-effects are expected to eventually happen. Unnecessary yields may be avoided by inserting yield instructions at the points the specific side-effects may occur.

In one embodiment, the compiler may be configured to insert a YIELD instruction along any control path that does not terminate in a statically determined number of instructions. Although the compiler may try to aggressively eliminate YIELD instructions where the compiler can prove that a YIELD instruction is not necessary, in one embodiment, YIELD instructions may be inserted before any branch instructions that may branch backwards (to a program counter with a lower value than the branch itself) to guarantee forward progress. A further optimization is to only insert YIELD instructions where there are loads from volatile memory locations.

A YIELD instruction may result in a missed synchronization opportunity. For example, if a thread executes a YIELD instruction, then other threads waiting at the next convergence barrier are free to continue without the yielding thread. If the YIELD instruction was executed conservatively, and the yielded threads would have eventually reached the convergence barrier, then some performance may be lost when divergent paths are not executed simultaneously.

A straightforward optimization that minimizes the number of lost synchronization opportunities is to only release a convergence barrier that is waiting on 'yielded' threads when the scheduler unit 410 selects a thread for execution that is waiting on the convergence barrier. Another straightforward optimization to reduce the number of lost synchronization opportunities is to clear the 'yielded' state from threads when that state is used to release a convergence barrier. The yielded state is cleared by updating the thread state 440 for each yielded thread to a different state, such as ready. Yet another optimization would be to elide YIELD instructions with some probability (e.g. ignore YIELD instructions until a timer expires, until a number of cycles have elapsed, until a number of branch instructions have been executed, etc). In one embodiment, software performs a YIELD optimization, for example, by annotating YIELD instructions with an expected frequency count, such that in a short loop, the YIELD instruction is elided by the scheduler unit 410 until a software-specified (e.g., programmable) counter value is exceeded.

Figure 5E:
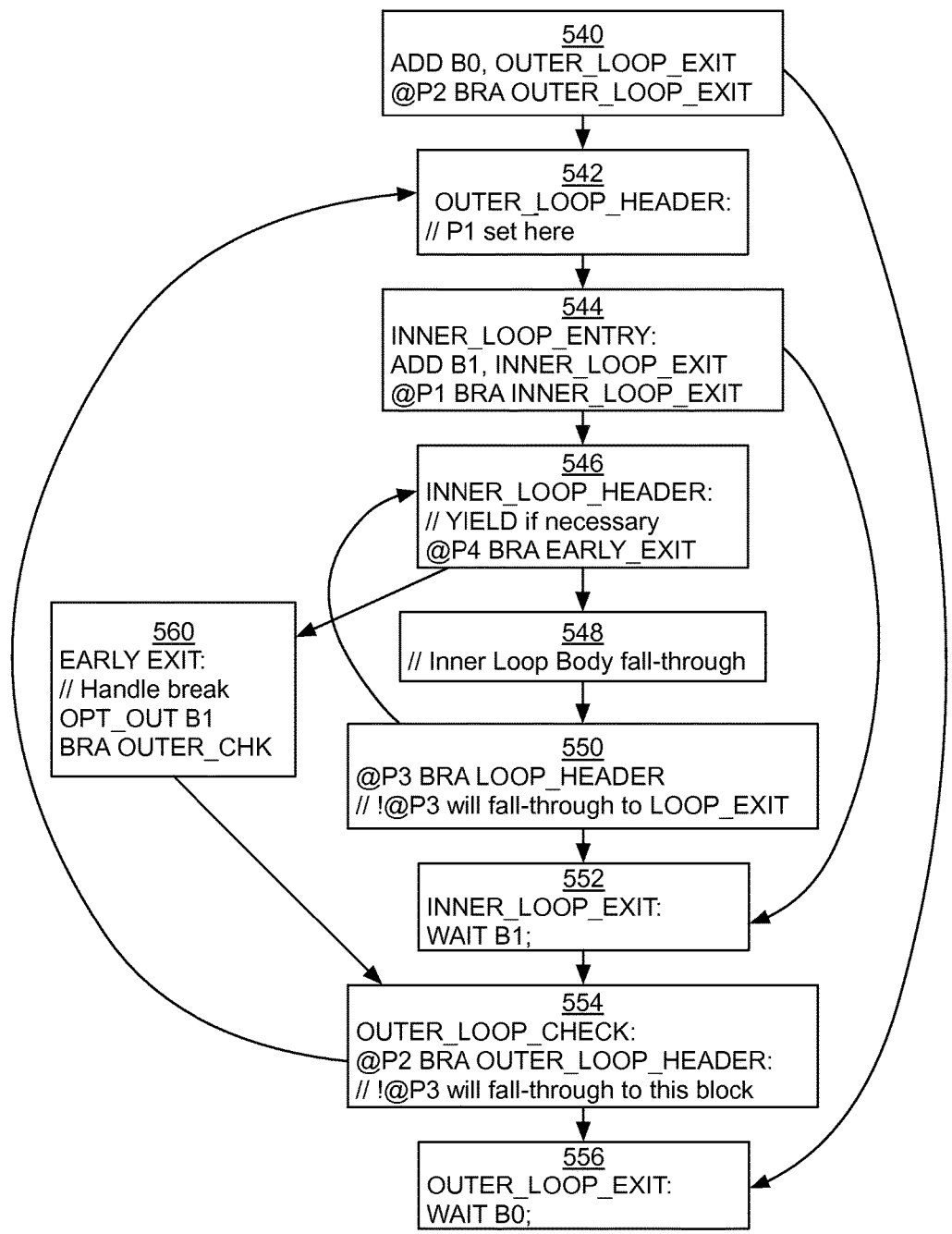
FIG. 5E illustrates an example of a convergence barrier for a region of a program with short-circuit control flow, in accordance with one embodiment.

FIG. 5E illustrates a control flow graph for a region of a program with short-circuit control flow, in accordance with one embodiment. Each node 540, 542, 544, 546, 548, 550, 552, 554, 556, and 560 in the control flow graph represents a block of one or more instructions that are executed in sequence without any branches. An edge connecting two nodes represents a branch.

All induced subgraphs of the program control flow graph that are not structured are unstructured. Unstructured control flow contains multiple entry points, multiple exit points, or both. In one embodiment, convergence barriers handle control flow regions with multiple exit points by introducing a third primitive operation (OPT-OUT). OPT-OUT allows a set of threads that were previously added to a convergence barrier to exit the convergence barrier without blocking. In one embodiment, the compiler may handle a control flow region with multiple exit points by designating one exit point the "primary" exit point and placing a WAIT instruction at that point. Other exit points are then assigned OPT-OUT operations. A short-circuit control flow, where control can opt-out of a convergence barrier B1 for an inner loop and proceed directly to an outer convergence barrier B0 is shown in FIG. 5E.

In the node 540, threads are added to the convergence barrier B0 at the entry point to the region of the program. The threads may diverge when the branch instruction (BRA) is executed. A first divergent path branches around an outer loop to the node 556 and a second divergent path continues through the nodes 542, 544, and 546. A first set of divergent threads that take the first divergent path may include zero threads or up to all threads that participate in the convergence barrier B0. A second set of divergent threads that take the second divergent path includes the remaining threads that participate in the convergence barrier B0.

In the node 544, the threads in the second set of divergent threads are added to the convergence barrier B1 at the entry point to an inner loop within the region of the program. The threads may diverge when the branch instruction (BRA) in the node 544 is executed. A third divergent path branches around the inner loop to the node 552 and a fourth divergent path continues to the node 546. A third set of divergent threads that take the third divergent path may include zero threads or up to all threads that participate in the convergence barrier B1. A fourth set of divergent threads that take the fourth divergent path includes the remaining threads that participate in the convergence barrier B1.

Threads in the fourth set of divergent threads that take an early exit path are a fifth set of divergent threads that explicitly opt out of the inner loop on a fifth divergent path through the node 560. The threads in the fifth set of divergent threads execute an OPT-OUT instruction in the node 560 and exit the convergence barrier B1. When the OPT-OUT instruction is executed, the thread state 440 is unchanged are remains ready. However, the threads in the fifth set of divergent threads still need to synchronize on the convergence barrier B0 at the node 556, the threads in the fifth set of divergent threads continue to the node 554. The remaining threads in the fourth set of divergent threads that do not take the early exit path through the node 560 eventually execute the WAIT instruction at the node 552 and are blocked at the convergence barrier B1 or execute a YIELD instruction in the node 546. When the remaining threads in the fourth set of divergent threads that are not yielding synchronize at the convergence barrier B1, the convergence barrier B1 is cleared and the remaining threads proceed to the node 554.

In one embodiment, any of the remaining threads that were yielding when the convergence barrier B1 is cleared transition from the yielding state to the ready state. A yielding thread only yields for one convergence barrier. As each thread reaches the node 556 and executes the WAIT instruction at the convergence barrier B0, the thread is blocked until all of the threads have executed the WAIT instruction. When all of the threads participating in the convergence barrier B0 are blocked, the convergence barrier B0 is cleared and the threads execute subsequent instructions in a SIMD manner.

The use cases described above offer examples of specific control flow examples that may utilize convergence barriers. However, a variety of use cases and applications of the concept described above are contemplated as being within the scope of the present disclosure.

Figure 6:
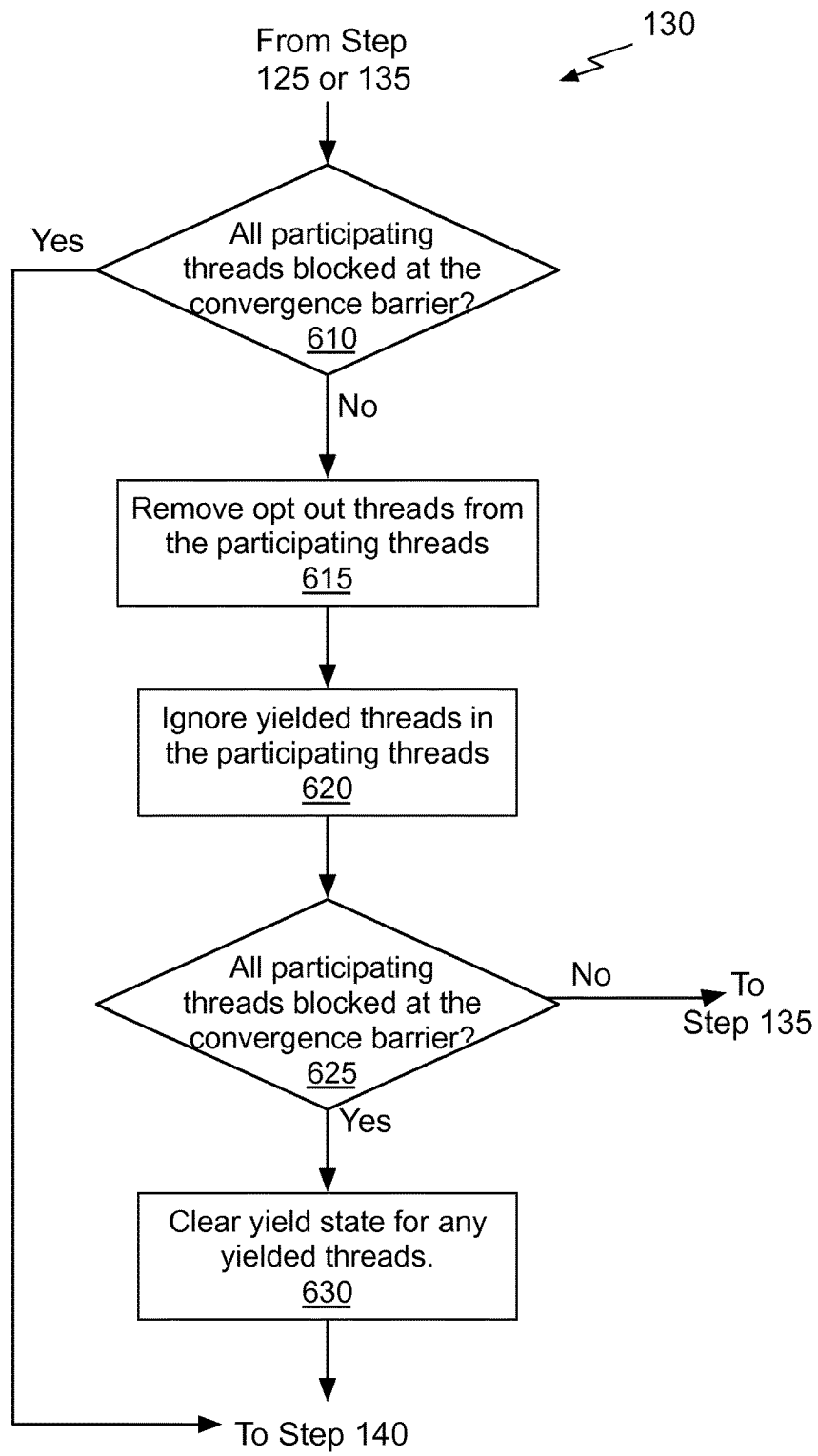
FIG. 6 illustrates a flowchart of a method for testing for synchronization at a convergence barrier for a step of FIG. 1, in accordance with one embodiment.

FIG. 6 illustrates a flowchart of a method for testing for synchronization at a convergence barrier for the step 130 of FIG. 1, in accordance with one embodiment. At step 610, the scheduler unit 410 determines if all of the participating threads are synchronized at the convergence barrier. In one embodiment, the scheduler unit 410 determines that all of the threads participating in the convergence barrier (indicated by the barrier participation mask 425) are synchronized when all of the participating threads have reached the convergence barrier instruction matching the name specified by the ADD instruction and the thread state 440 for each of the participating threads is blocked. The threads that are at the convergence barrier have the same program counter value stored in the thread rPC 445.

If, at step 610, the scheduler unit 410 determines that all of the participating threads that are participating in the convergence barrier are blocked at the convergence barrier, then the scheduler unit 410 proceeds directly to step 140. Otherwise, at step 615, the scheduler unit 410 removes any of the participating threads that executed an OPT-OUT instruction from the participating threads. In one embodiment, bits in the barrier participation mask 425 corresponding to each thread that executed an OPT-OUT instruction are cleared. In one embodiment, participating threads that execute an OPT-OUT instruction are removed from the participating threads when the OPT-OUT instruction is executed and step 615 is omitted. The thread state 440 for each of the threads participating in the convergence barrier that execute an OPT-OUT instruction changes from ready to exited.

At step 620, the scheduler unit 410 ignores any of the participating threads that executed a YIELD instruction from the participating threads. Unlike the threads that have executed the OPT-OUT instruction, the threads that are in the yielding state are not removed, but are instead ignored for the convergence barrier release analysis. In other words, the bits in the barrier participation mask 425 corresponding to each thread that executed a YIELD instruction are not cleared, so the yielding threads still participate in the convergence barrier. The thread state 440 for each of the threads participating in the convergence barrier that execute a YIELD instruction changes from ready to yielded. Note, that when a portion of threads diverge and take the same path that includes a YIELD instruction, all of the threads in divergent group do not necessarily execute a YIELD instruction. In other words, only a subset of the threads in the divergent group may execute the YIELD instruction and change from ready to yielded. The remaining threads in the divergent group may remain ready.

At step 625, the scheduler unit 410 ignores any participating threads that are in the yielded state (according to the threads state 440) and determines if all of the participating threads are synchronized at the convergence barrier.

If, at step 625, the scheduler unit 410 determines that all of the non-yielding threads participating in the convergence barrier are blocked at the convergence barrier, then the scheduler unit 410 proceeds to step 630. Otherwise the scheduler unit 410 proceeds directly to step 135. At step 630, the scheduler unit 410 clears the yielded state for any of the participating threads that executed a YIELD instruction and then proceeds to step 140. In one embodiment, the yielded state in the threads state 440 is changed from yielded to ready.

However, when at least one thread is checking on a volatile value (i.e., polling), the polling consumes execution cycles. A NANOSLEEP instruction improves execution efficiency for threads to check on a volatile value and then be suspended for a specified duration to allow other threads to execute. The NANOSLEEP instruction enables the expression of a back-off routine that prevents severe performance degradation when a thread is spinning in a loop waiting for synchronization to occur. The scheduler unit 410 tracks the specified duration and suspends any threads that have executed the NANOSLEEP instruction, changing the suspended threads back to the ready state when the specified duration has transpired.

We note that the convergence barrier mechanism has been described from the perspective of multiple threads mapped onto a single SIMD datapath. The divergent thread execution technique can also be applied directly to a multi-core processor with multiple datapaths, or a system that implements simultaneous multithreading or barrel processing where multiple sets of SIMD threads are scheduled onto a single SIMD datapath in MIMD fashion.

Figure 7:
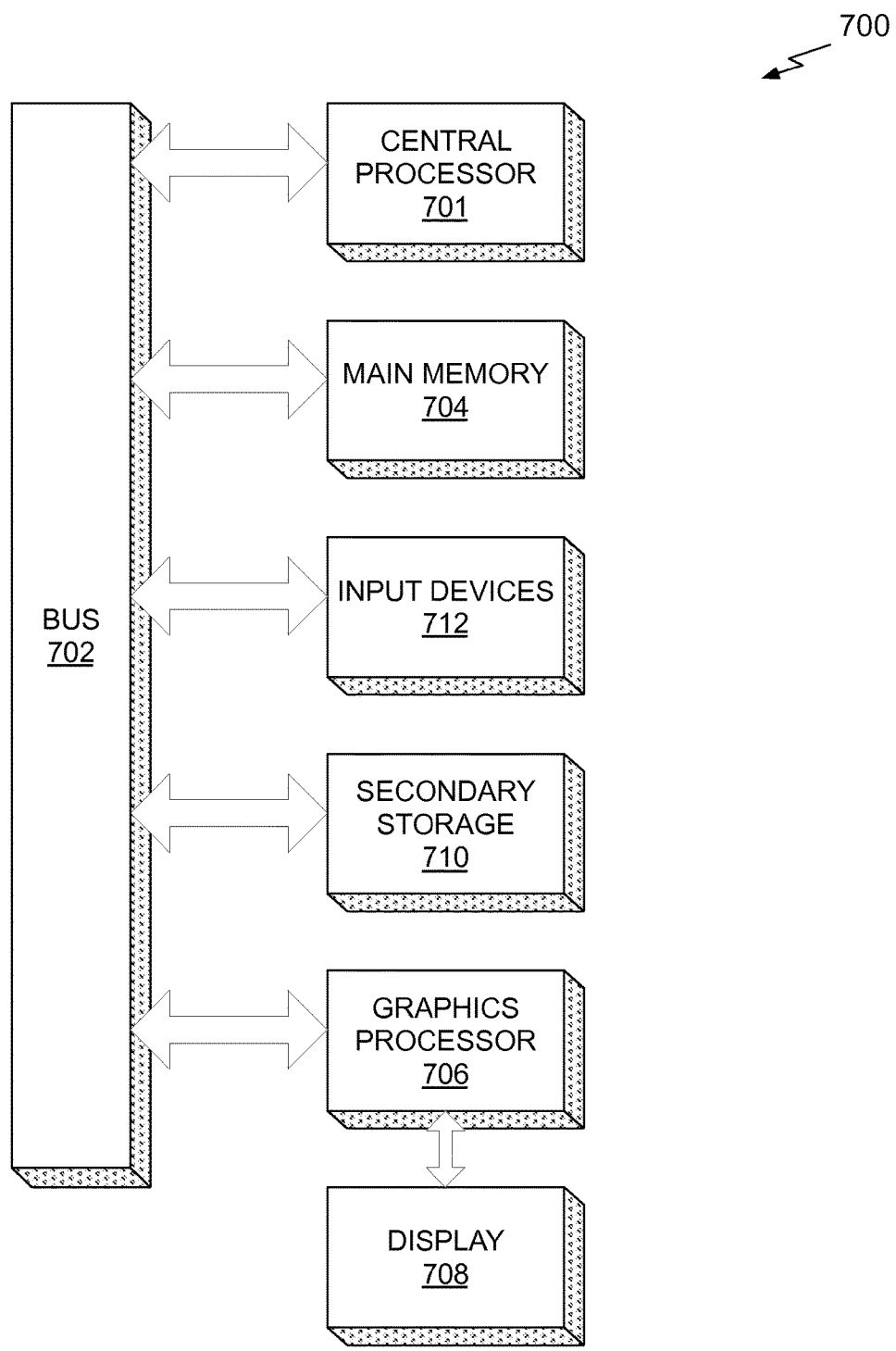
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    executing, for a plurality of threads, a first instruction in a program, wherein the first instruction, when executed by a thread, indicates to a scheduler unit that the thread participates in a convergence barrier;
    executing a first path through the program by a first divergent portion of the participating threads;
    executing a second path through the program by a second divergent portion of the participating threads, wherein the first path and the second path diverge;
    executing, by the first divergent portion of the participating threads, a second instruction in the program, wherein the second instruction, when executed by a first thread, causes the first thread to transition to a blocked state at the convergence barrier;
    changing a second thread in the second divergent portion of the participating threads to a yielded state when a third instruction that is different than the second instruction is executed by the second divergent portion of the participating threads, wherein the second thread does not arrive at the convergence barrier before the convergence barrier is cleared;
    determining that the participating threads are synchronized at the convergence barrier when each thread of the participating threads is in either the blocked state or the yielded state; and
    clearing the convergence barrier when the participating threads are synchronized.

2. The method of claim 1, wherein the third instruction is inserted into the program by a compiler.

3. The method of claim 1, wherein the first divergent portion of the participating threads is executed simultaneously with the second divergent portion of the participating threads.

4. The method of claim 1, wherein the first divergent portion of the participating threads and the second divergent portion of the participating threads are executed serially.

5. The method of claim 1, further comprising removing the second thread from the participating threads when the third instruction is executed by the second thread.

6. The method of claim 5, further comprising, after clearing the convergence barrier, synchronously executing the participating threads that were synchronized at the convergence barrier.

7. The method of claim 1, wherein a first convergence barrier name specified by the first instruction corresponds to a second convergence barrier name specified by the second instruction.

8. The method of claim 1, wherein the first instruction is inserted into the program by a compiler.

9. The method of claim 1, wherein the first instruction is at an entry point to a region of the program and the second instruction is at an exit point to the region of the program.

10. The method of claim 1, wherein the second instruction is inserted, by a compiler, at an exit point in the program to define the convergence barrier.

11. The method of claim 1, further comprising:
    executing, for at least one additional thread that is not included in the plurality of threads, the first instruction in the program; and
    indicating, to the scheduler unit, that the additional thread participates in the convergence barrier.

12. A non-transitory computer-readable storage medium storing instructions that, when executed by a processor, cause the processor to perform steps comprising:
    executing, for a plurality of threads, a first instruction in a program, wherein the first instruction, when executed by a thread, indicates to a scheduler unit that the thread participates in a convergence barrier;
    executing a first path through the program by a first divergent portion of the participating threads;
    executing a second path through the program by a second divergent portion of the participating threads, wherein the first path and the second path diverge;
    executing, by the first divergent portion of the participating threads, a second instruction in the program, wherein the second instruction, when executed by a first thread, causes the first thread to transition to a blocked state at the convergence barrier;
    changing a second thread in the second divergent portion of the participating threads to a yielded state when a third instruction that is different than the second instruction is executed by the second divergent portion of the participating threads, wherein the second thread does not arrive at the convergence barrier before the convergence barrier is cleared;
    determining that the participating threads are synchronized at the convergence barrier when each thread of the participating threads is in either the blocked state or the yielded state; and
    clearing the convergence barrier when the participating threads are synchronized.

13. A system, comprising:
    a parallel processing unit configured to synchronize a plurality of threads by:
    executing, for the plurality of threads, a first instruction at an entry point in a program, wherein the first instruction, when executed by a thread, indicates to a scheduler unit that the thread participates in a convergence barrier;

executing a first path through the program by a first divergent portion of the participating threads;

executing a second path through the program by a second divergent portion of the participating threads, wherein the first path and the second path diverge;

executing, by the first divergent portion of the participating threads, a second instruction in the program, wherein the second instruction, when executed by a first thread, causes the first thread to transition to a blocked state at the convergence barrier;

changing a second thread in the second divergent portion of the participating threads to a yielded state when a third instruction that is different than the second instruction is executed by the second divergent portion of the participating threads, wherein the second thread does not arrive at the convergence barrier before the convergence barrier is cleared;

determining that the participating threads are synchronized at the convergence barrier when each thread of the participating threads is in either the blocked state or the yielded state; and clearing the convergence barrier when the participating threads are synchronized.

14. The system of claim 13, wherein the parallel processing unit includes a plurality of programmable streaming multiprocessors (SM), each SM configured to execute the plurality of the threads in parallel.

15. The non-transitory computer-readable storage medium of claim 12, wherein the first divergent portion of the participating threads is executed simultaneously with the second divergent portion of the participating threads.

16. The non-transitory computer-readable storage medium of claim 12, further comprising:

executing, for at least one additional thread that is not included in the plurality of threads, the first instruction in the program; and indicating, to the scheduler unit, that the additional thread participates in the convergence barrier.

17. The system of claim 13, wherein the parallel processing unit is further configured to execute the first divergent portion of the participating threads simultaneously with the second divergent portion of the participating threads.

18. The system of claim 13, wherein the parallel processing unit is further configured to execute the first divergent portion of the participating threads and the second divergent portion of the participating threads serially.

19. The system of claim 13, wherein the parallel processing unit is further configured to remove the second thread from the participating threads when the third instruction is executed by the second thread.

20. The system of claim 13, wherein the parallel processing unit is further configured to:

execute, for at least one additional thread that is not included in the plurality of threads, the first instruction in the program; and indicate, to the scheduler unit, that the additional thread participates in the convergence barrier.

* * * * *

UNITED STATES PATENT AND TRADEMARK OFFICE
CERTIFICATE OF CORRECTION

PATENT NO. : 10,067,768 B2
APPLICATION NO. : 14/798265
DATED : September 4, 2018
INVENTOR(S) : Gregory Frederick Diamos et al.

Page 1 of 1

It is certified that error appears in the above-identified patent and that said Letters Patent is hereby corrected as shown below:

In the Specification

At Column 1, Line number 4, please add the following sentence:
--This invention was made with US Government support under LLNS subcontract B599861 awarded by DOE. The US Government has certain rights in the invention.--

Signed and Sealed this
Twenty-first Day of July, 2020

Andrei Iancu
*Director of the United States Patent and Trademark Office*